(12) United States Patent
Bagga et al.

(10) Patent No.: US 7,873,995 B2
(45) Date of Patent: Jan. 18, 2011

(54) METHOD AND APPARATUS FOR GENERATING AND REINFORCING USER PASSWORDS

(75) Inventors: Amit Bagga, Green Brook, NJ (US); Jon Bentley, New Providence, NJ (US); Lawrence O'Gorman, Madison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1632 days.

(21) Appl. No.: 10/674,288

(22) Filed: Sep. 29, 2003

(65) Prior Publication Data

US 2005/0071686 A1 Mar. 31, 2005

(51) Int. Cl.
*G06F 12/00* (2006.01)
(52) U.S. Cl. .............................. 726/19; 726/6; 713/184; 380/44; 380/51
(58) Field of Classification Search ......... 713/182–185; 711/164; 725/30; 705/18; 340/825.34
See application file for complete search history.

(56) References Cited

U.S. PATENT DOCUMENTS

| | | | | |
|---|---|---|---|---|
| 4,802,217 A | * | 1/1989 | Michener | 380/29 |
| 5,425,102 A | * | 6/1995 | Moy | 713/183 |
| 5,719,560 A | * | 2/1998 | Watkins | 340/5.5 |
| 6,643,784 B1 | * | 11/2003 | McCulligh | 726/18 |
| 6,954,862 B2 | * | 10/2005 | Serpa | 726/5 |
| 6,973,575 B2 | * | 12/2005 | Arnold | 713/186 |
| 7,093,298 B2 | * | 8/2006 | Rodriquez et al. | 726/28 |

* cited by examiner

*Primary Examiner*—Thanhnga B Truong
(74) *Attorney, Agent, or Firm*—Joseph B. Ryan; Jason Paul DeMont; Wayne S. Breyer

(57) ABSTRACT

A method and apparatus are provided for generating passwords that may be memorized by a user, yet not easily guessed by an attacker. A user is presented with one or more textual, audio or visual hints. A password is automatically generated based on the selected hint (and possibly further input from the user). The presented hints may include poems, songs, jokes, pictures or words. The generated password and selected hint can be presented to the user during enrollment for further reinforcement and stored in a user database for subsequent reinforcement and verification. The enrollment process may schedule the sending of one or more reminder messages to the user containing the hint to reinforce the password in the user's memory.

15 Claims, 8 Drawing Sheets

FIG. 3

USER DATABASE - 300

| USER NAME | PASSWORD | REINFORCEMENT |
|---|---|---|
| JOHN SMITH | g<$2a'%U | The MONkey TOOK one LOOK at JIM/ and THREW the PEAnuts BACK at HIM |
| ⋮ | ⋮ | ⋮ |
| BILL FRANKS | goat, railroad tie | VISUAL IMAGE (FIG. 10) |
| JILL DOE | Extravagant, thermometer, different | VISUAL IMAGE (FIG. 11) |

305 — JOHN SMITH row
310 — ⋮
315 — BILL FRANKS row
320 — JILL DOE row

330 USER NAME, 340 PASSWORD, 350 REINFORCEMENT

FIG. 4

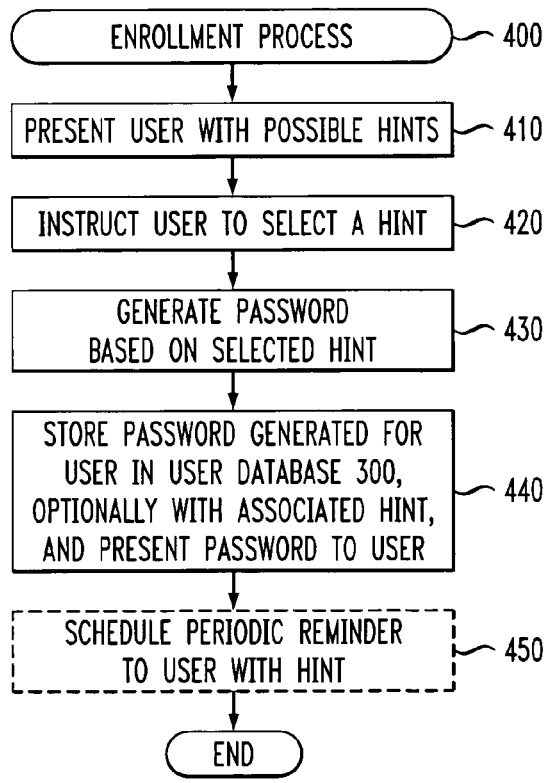

- 400 ENROLLMENT PROCESS
- 410 PRESENT USER WITH POSSIBLE HINTS
- 420 INSTRUCT USER TO SELECT A HINT
- 430 GENERATE PASSWORD BASED ON SELECTED HINT
- 440 STORE PASSWORD GENERATED FOR USER IN USER DATABASE 300, OPTIONALLY WITH ASSOCIATED HINT, AND PRESENT PASSWORD TO USER
- 450 SCHEDULE PERIODIC REMINDER TO USER WITH HINT
- END

FIG. 8

RHYME DICTIONARY - 800

| ONE SYLLABLE | TWO SYLLABLES | THREE SYLLABLES | FOUR SYLLABLES | OTHER RHYMES |
|---|---|---|---|---|
| RHYMING CLASSES:<br>a j k<br>b c d e g p t v z 3<br>q u 2<br>r * (STAR)<br>i y<br>/ (SLASH) - (DASH)<br><br>NON-RHYMING CLASSES:<br>f h l m n o s x<br>1 4 5 6 6 8 9<br>! (BANG)<br>@ (AT)<br># (SHARP)<br>+ (PLUS)<br>. (DOT)<br>& (AND) | w (dubya)<br>cap -<letter except for w><br>0<br>7<br>$ (DOLLAR)<br>% (PERCENT)<br>= (EQUALS)<br>] (CLOSE BRACE)<br>: (COLON)<br>; (SEMI)<br>< (LESS THAN)<br>, (COMMA)<br>? (QUESTION)<br>\ (BACKSLASH)<br>~ (TILDE) | W (CAP-DUBYA)<br>^ (UP-ARROW)<br>& (AMPERSAND)<br>) (CLOSE PAREN)<br>_ (UNDERSCORE)<br>[ (OPEN BRACE)<br>} (CLOSE CURLY)<br>" (DOUBLE QUOTE)<br>' (SINGLE QUOTE)<br>> (GREATER THAN) | ( (OPEN PAREN)<br>{ (OPEN CURLY)<br>< (OPEN ANGLE) | SLASH DASH BACKSLASH<br>SINGLE-QUOTE<br>DOUBLE-QUOTE<br>UNDERSCORE 4 |

FIG. 9

Registration: Completion

Password: g<$2a?%U
Hint: The monkey took one look at Jim

Many people find it easier to remember their secrets if they receive periodic reminders. Please indicate below what, if any, reminders you wish to receive.

E-Mail Reminders — 910

E-Mail Address:
jbentley@avaya.com

Frequency of Reminders
○ Weekly
◉ Monthly
○ None

☐ Check here to receive the secret number along with the reminder.

Telephone Reminders — 920

Telephone Number:
908-696-5207

Frequency of Reminders
○ Weekly
○ Monthly
◉ None

Telephone reminders do not give your secret numbers.

Exit

Done

900

METHOD AND APPARATUS FOR GENERATING AND REINFORCING USER PASSWORDS

FIELD OF THE INVENTION

The present invention relates generally to user authentication techniques and more particularly, to methods and apparatus for generating user passwords.

BACKGROUND OF THE INVENTION

A number of security issues arise when computers or other resources are accessible by humans. Most computers and computer networks incorporate computer security techniques, such as access control mechanisms, to prevent unauthorized users from accessing remote resources. Human authentication is the process of verifying the identity of a user in a computer system, often as a prerequisite to allowing access to resources in the system. A number of authentication protocols have been proposed or suggested to prevent the unauthorized access of remote resources. In one variation, each user has a password that is presumably known only to the authorized user and to the authenticating host. Before accessing the remote resource, the user must provide the appropriate password, to prove his or her authority.

Generally, a good password is easy for the user to remember, yet not easily guessed by an attacker. In order to improve the security of passwords, the number of login attempts is often limited (to prevent an attacker from guessing a password) and users are often required to change their password periodically. Some systems use simple methods such as minimum password length, prohibition of dictionary words and information extraction techniques to evaluate a user selected password at the time the password is selected, to ensure that the password is not particularly susceptible to being guessed. As a result, users are often prevented from using passwords that are easily recalled. In addition, many systems generate random passwords that users are required to use.

Thus, some users employ mnemonic aids and other learning tools in order to memorize passwords by establishing associations with the new password. For example, a user may employ a story, music or poetry associations to remember a password. Even after a user memorizes a password, however, such memory will degrade over time. Thus to avoid the problems associated with forgetting a password, many users will write their password down or store the password in a computer file, which potentially compromises system security. A need therefore exists for a method and apparatus that generates passwords that are easy for the user to remember, yet not easily guessed by an attacker. A further need therefore exists for a method and apparatus that sends periodic password reminders to a user to reinforce the password.

SUMMARY OF THE INVENTION

The present invention provides a method and apparatus for generating passwords that may be memorized by a user, yet not easily guessed by an attacker. A disclosed enrollment process presents the user with one or more textual, audio or visual hints. The presented hints may include poems, songs, jokes, pictures or words. A password is automatically generated by a password enrollment/verification server, based on the selected hint (and possibly further input from the user). In one embodiment, if a user selects a poem as a hint, the enrollment process will generate a password having the same rhyme and meter as the selected poem. The generated password and selected hint can be presented to the user for further reinforcement and stored in a user database. The enrollment process may schedule the sending of one or more reminder messages to the user containing the hint to reinforce the password in the user's memory.

According to another aspect of the invention, a method and apparatus are provided that send periodic password reminders to a user to reinforce the generated password. For example, if a password is generated based on a poem, the poem can be periodically sent to the user. The poem or other hint can optionally be presented to the user during a verification phase as a hint to evoke the password in the user's memory, without compromising the security of the system.

In a pass poem implementation of the invention, passwords are generated with the same rhyme and meter as a user selected poem. During the enrollment phase, the user can be presented with one or more of the selected poem, a corresponding rhythm (meter) of the selected poem, an annotated version of the selected poem, a spoken version of the generated password and the actual generated password to reinforce the password into the user's memory.

In a pass joke implementation of the invention, passwords are generated based on a selected joke. The user is presented with a number of jokes each containing one of a number of different variations for one or more variable words or phrases included in each joke. The variable words or phrases can be modified for each user to generate a sufficiently random password for each user. Once the user selects a particular joke as a hint, the user specific combination of variable words or phrases becomes the generated password. A visual image containing key elements of the joke can optionally be sent to the user during and subsequent to enrollment to reinforce the password.

In pass word and pass picture implementations of the invention, passwords are generated based on a set of words or icons selected by the user from a larger set of words or icons, respectively. For each word selected by the user, a visual image or a constructed sentence can be presented during or subsequent to enrollment to reinforce the set of pass words. A pass picture can be constructed in accordance with one embodiment by presenting a user with a set of "drag and drop" icons (on the order of several dozen), from which the user must select a subset of the "drag and drop" icons to position in a visual image. The resulting visual image becomes a password that the user must recreate in order to obtain access to a protected resource. Alternatively, the user can be queried about content of the image or can create a password using, for example, initials from the resulting scene. The resulting visual image can be presented to the user during or subsequent to enrollment to help reinforce the pass picture.

A more complete understanding of the present invention, as well as further features and advantages of the present invention, will be obtained by reference to the following detailed description and drawings.

BRIEF DESCRIPTION OF THE DRAWINGS

FIG. 3 is a sample table from an exemplary user database of FIGS. 1 and 2;

FIG. 4 is a flow chart describing an exemplary implementation of an enrollment process of FIG. 2 incorporating features of the present invention;

FIG. 8 is an exemplary letter dictionary that is used to generate a password with the same rhyme and meter as a selected poem;

FIG. 9 is an exemplary user interface for specifying whether reminders should be sent to a user.

DETAILED DESCRIPTION

Figure 1:
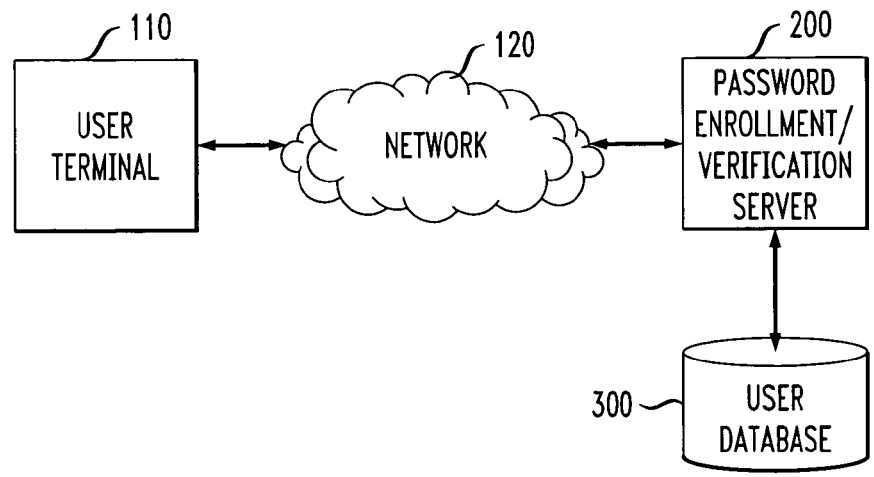
FIG. 1 illustrates a network environment in which the present invention can operate.

FIG. 1 illustrates a network environment in which the present invention can operate. As shown in FIG. 1, a user employing a user device 110 attempts to access a remote protected resource over a network 120. In order to access the protected resource, such as a hardware device or bank account, the user must present an appropriate password. The user password is generated during an enrollment phase by a password enrollment/verification server 200, discussed further below in conjunction with FIG. 2. The network(s) 120 may be any combination of wired or wireless networks, such as the Internet and the Public Switched Telephone Network (PSTN). The password enrollment/verification server 200 may be associated, for example, with a call center or web server. It is noted that the present invention also applies in a stand-alone mode, for example, to control access to a given personal computer. Thus, in such an embodiment, the password enrollment/verification server 200 would be integrated with the user device 110. It is also noted that the password generation and authentication functions performed by the password enrollment/verification server 200 can be performed by two distinct computing systems.

According to one aspect of the invention, passwords generated by the password enrollment/verification server 200 during an enrollment phase are based on a textual, audio or visual hint that can be selected by the user. For example, as discussed further below, if a user selects a poem as a hint, the password enrollment/verification server 200 will generate a password having the same rhyme and meter as the selected poem. According to another aspect of the invention, the password enrollment/verification server 200 can optionally send periodic reminders to the user to reinforce the generated password. Thus, if a password is generated based on a poem, the poem can be periodically sent to the user, for example, by email or telephone message. In addition, the poem or other hint can optionally be presented to the user during a verification phase as a hint, without compromising the security of the system. In this manner, the hint presented at verification evokes the password in the user's memory.

Figure 2:
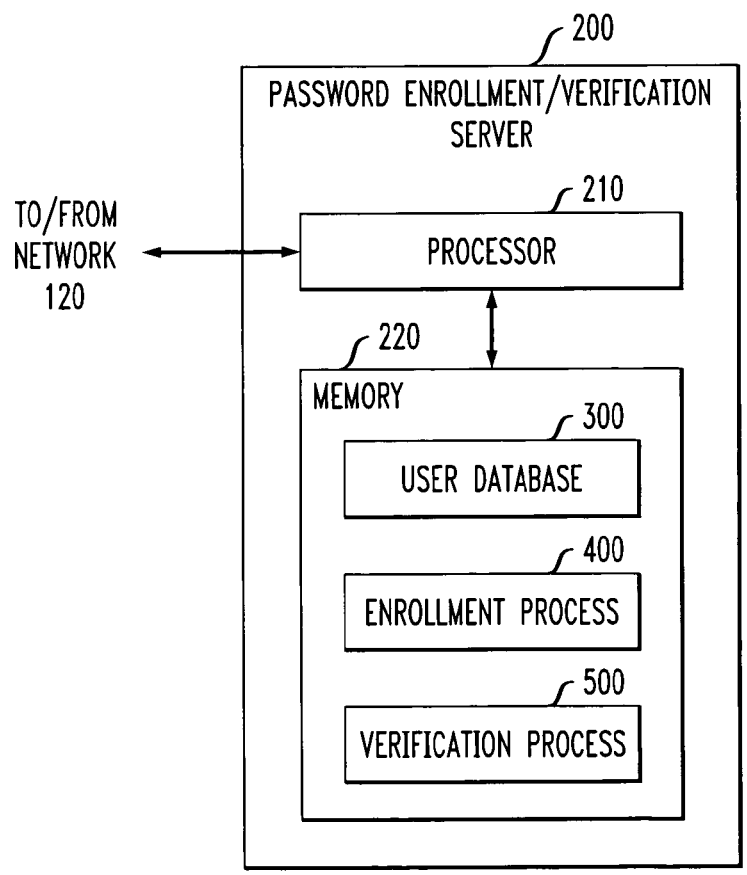
FIG. 2 is a schematic block diagram illustrating the password enrollment/verification server of FIG. 1 in further detail.

FIG. 2 is a schematic block diagram of an exemplary password enrollment/verification server 200 incorporating features of the present invention. The password enrollment/verification server 200 may be any computing device, such as a personal computer, work station or server. As shown in FIG. 2, the exemplary password enrollment/verification server 200 includes a processor 210 and a memory 220, in addition to other conventional elements (not shown). The processor 210 operates in conjunction with the memory 220 to execute one or more software programs. Such programs may be stored in memory 220 or another storage device accessible to the password enrollment/verification server 200 and executed by the processor 210 in a conventional manner.

For example, as discussed below in conjunction with FIGS. 3 through 5, the memory 220 may store a user database 300, an enrollment process 400 and a verification process 500. Generally, the user database 300 records the password that was generated for each enrolled user. The enrollment process 400 presents the user with one or more textual, audio or visual hints from which a unique password can be generated for each user. The verification process 500 authenticates a user attempting to access a protected resource and optionally presents the user with the associated hint as part of the challenge.

FIG. 3 is a sample table from an exemplary user database 300 of FIGS. 1 and 2. The user database 300 records the password that was generated for each enrolled user. As shown in FIG. 3, the user database 300 consists of a plurality of records, such as records 305-320, each associated with a different enrolled user. For each enrolled user, the user database 300 identifies the user in field 330, as well as the generated password in field 340 and optionally provides an associated reinforcement hint in field 350.

FIG. 4 is a flow chart describing an exemplary implementation of an enrollment process 400 of FIG. 2 incorporating features of the present invention. As previously indicated, the exemplary enrollment process 400 presents the user with one or more textual, audio or visual hints from which a unique password can be generated for each user.

As shown in FIG. 4, in the exemplary embodiment, a user is initially presented with a number of alternative textual, visual or audio hints during step 410 and the user is instructed to select a hint during step 420. A password is then automatically generated during step 430, based on the selected hint. For example, as discussed further below, if a user selects a poem as a hint, the enrollment process 400 will generate a password having the same rhyme and meter as the selected poem. It is noted that the password may be generated with or without further input from the user. In some implementations, the textual, visual or audio hints may require the user to provide information that is used in the generation of the password.

The generated password is stored during step 440 in the user database 300, optionally with the selected hint, and is presented to the user. One or more reminders may optionally be scheduled during step 450 to send to the user to reinforce the password in the user's memory.

The various hints that are presented by the enrollment process 400 to the user during step 410 should be selected so that the corresponding generated passwords have a sufficient number of bits (amount of information) to satisfy the security needs of the application.

Figure 5:
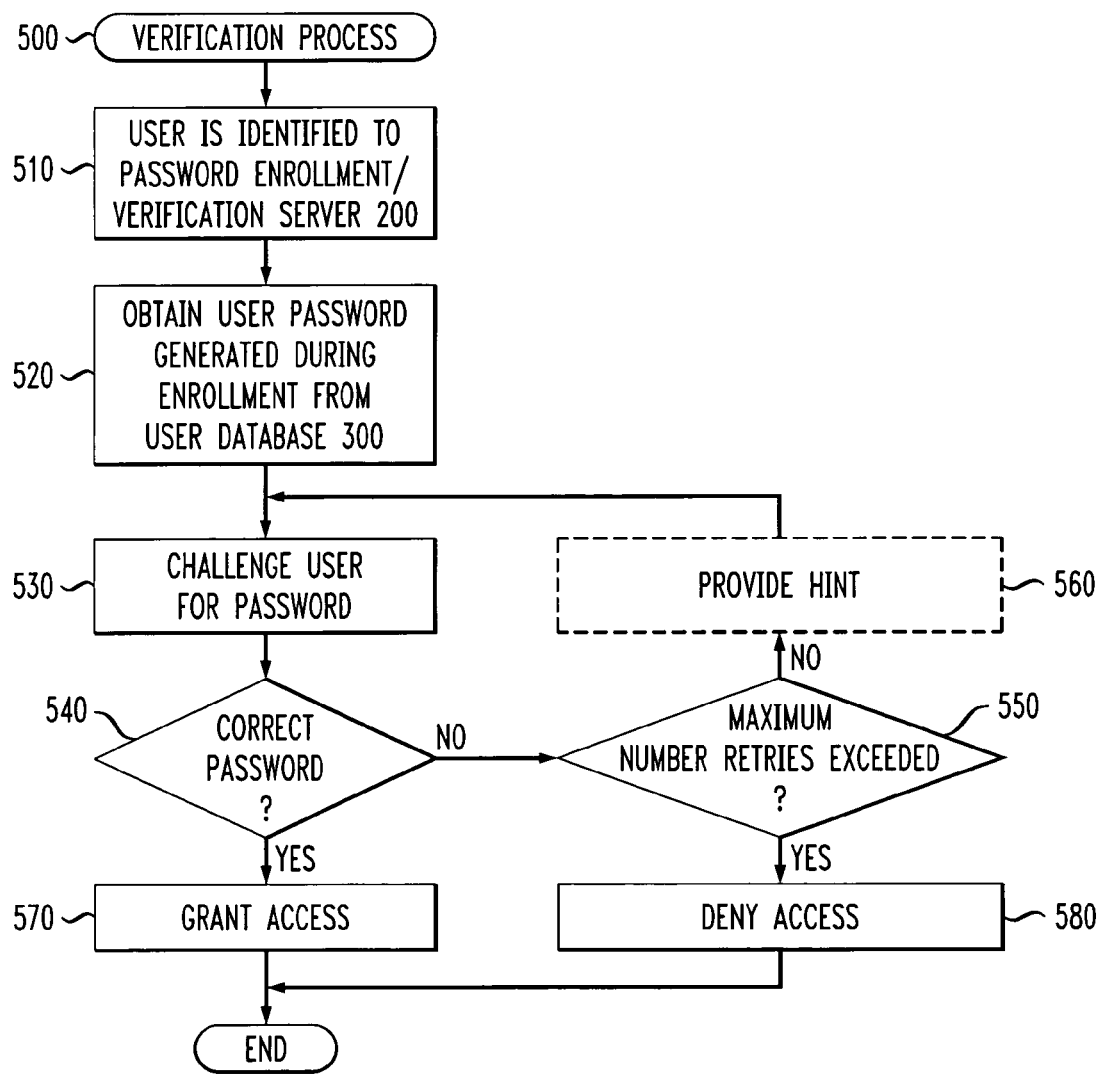
FIG. 5 is a flow chart describing an exemplary implementation of a verification process of FIG. 2 incorporating features of the present invention.

FIG. 5 is a flow chart describing an exemplary implementation of the verification process 500 of FIG. 2 incorporating features of the present invention. As previously indicated, the verification process 500 authenticates a user attempting to access a protected resource and optionally presents the user with the associated textual, audio or visual hint as part of the challenge.

As shown in FIG. 5, the user initially identifies himself (or herself) to the password enrollment/verification server 200 during step 510. During step 520, the verification process 500 obtains the user password that was generated for this user during the enrollment phase from the user database 200. The user is challenged for the password during step 530. The challenge may optionally include the hint associated with the password.

A test is performed during step 540 to determine if the password provided by the user matches the password obtained from the user database 200. If it is determined during step 540 that the passwords do not match, then a further test is performed during step 550 to determine if the maximum number of retry attempts has been exceeded. If it is determined during step 550 that the maximum number of retry attempts has not been exceeded, then the user can optionally be presented with a hint during step 560 before again being challenged for the password. If it was determined during step 550 that the maximum number of retry attempts has been exceeded, then the user is denied access during step 580.

If, however, it was determined during step 540 that the password provided by the user matches the password obtained from the user database 200, then the user is provided with access during step 570.

Pass Poems

As previously indicated, passwords generated by the password enrollment/verification server 200 during an enrollment phase are based on a textual, audio or visual hint that can be selected by the user. In one implementation, if a user selects a poem as a hint, the password enrollment/verification server 200 will generate a password having the same rhyme and meter as the selected poem.

Figure 6:
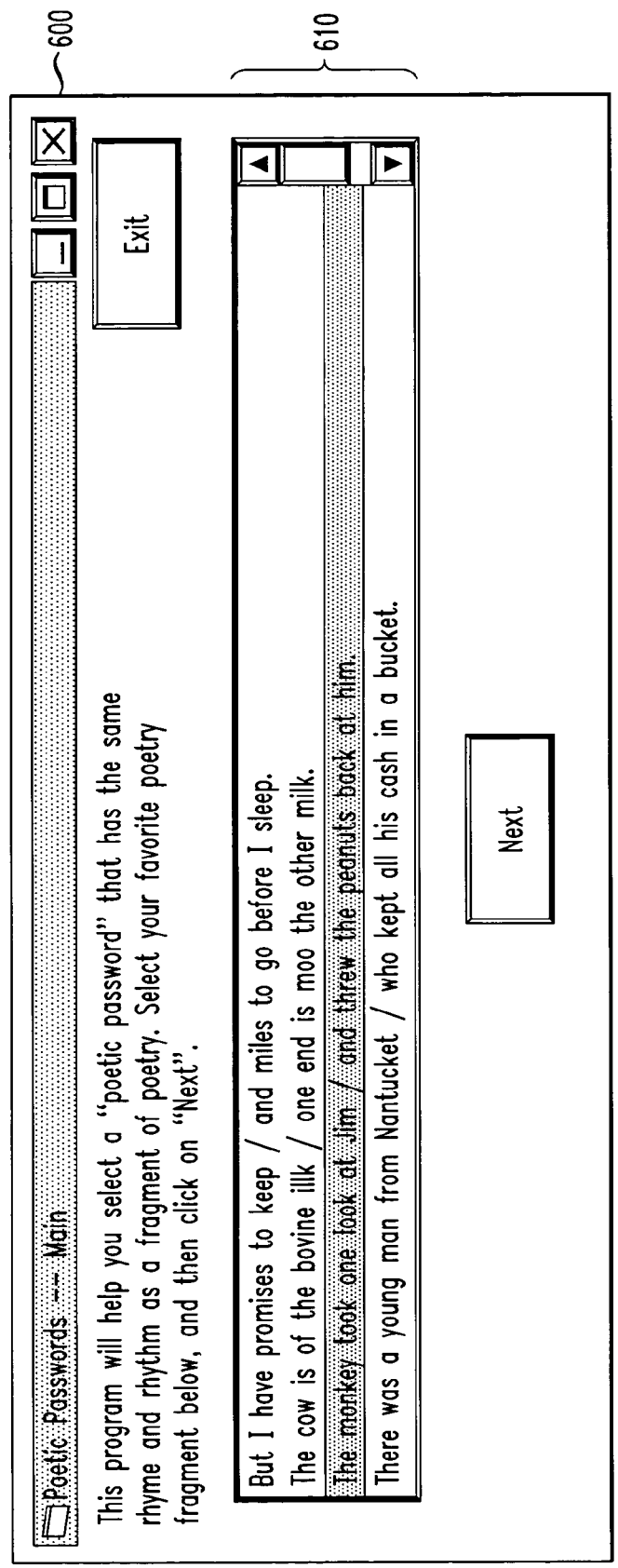
FIG. 6 is an exemplary user interface that presents a user with a set of poems that can be used to generate a password in accordance with one embodiment of the present invention.

FIG. 6 is an exemplary user interface 600 that presents a user with a set of poems 610 (during step 410 of the enrollment process 400) from which the user can select a given poem. For example, the user may select the following poem as a hint (during step 420): "The monkey took one look at Jim, and threw the peanuts back at him." The password enrollment/verification server 200 will then generate a password with the same rhyme and meter as the selected poem (step 430). In this manner, the user can recall the poem and remember the corresponding password.

Figure 7:
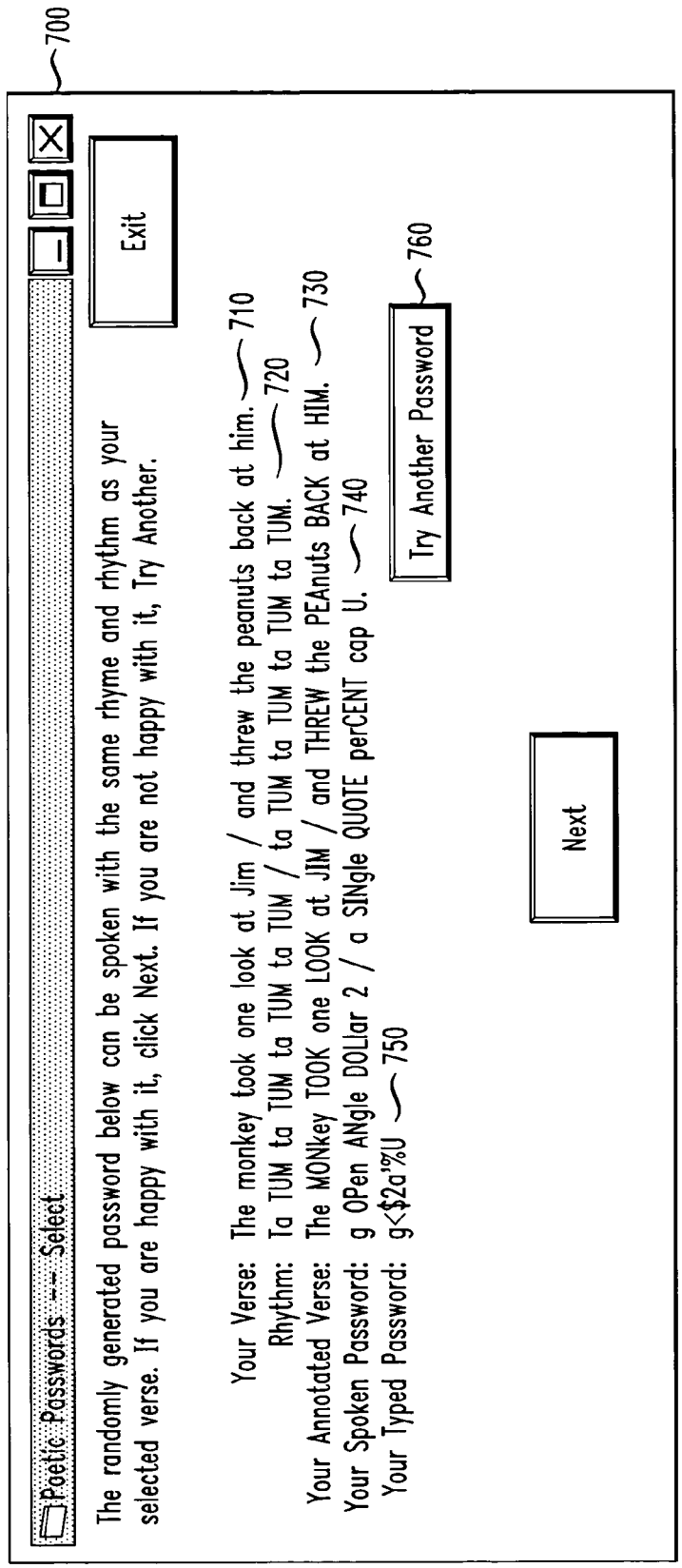
FIG. 7 is an exemplary user interface that presents the user with the generated password and the selected poem so that the user can associate the poem with the generated password in accordance with one embodiment of the present invention.

FIG. 7 is an exemplary user interface 700 that presents the user with the generated password and the selected poem so that the user can associate the poem with the generated password. As shown in FIG. 7, the selected poem is presented in field 710, the corresponding rhythm (meter) of the selected poem is presented in field 720, an annotated version of the selected poem is presented in field 730, a spoken version of the generated password is presented in field 740 and the actual generated password is presented in field 750. The generated password and associated hint are shown in record 305 of the user database 300. The exemplary information presented in the interface 700 assists with reinforcing the password into the user's memory. If the user has trouble remembering the generated password, the interface 700 can optionally include a button 760 to generate another password.

As shown in FIG. 7, the selected poem can be classified as having been composed in Iambic Tetrameter (that is, each line contains four iambs or "ta TUMs"). The corresponding random password may be generated using a letter dictionary that gives rhyme and meter for each keyboard character. In other words, the spoken version of a keyboard character, such as "open angle" for "<" can have an associated rhyme and meter that is used to create a password that rhymes with the original poem.

An exemplary letter dictionary 800 is shown in FIG. 8. As shown in FIG. 8, each of the keyboard characters are classified based on the number of syllables contained in the associated spoken version of the keyboard character. Thus, the dictionary 800 can be used to identify a character of a given number of syllables that rhymes with a given sound. In this manner, a password can be generated having the same rhyme and meter as a selected poem.

FIG. 9 is an exemplary user interface 900 that allows the user to specify whether reminders should be sent to the user, for example, by email or telephone message, in fields 910 and 920, respectively. In one implementation, the reminders can include the selected poem, and optionally the generated password.

Pass Jokes

In a further variation of the present invention, passwords generated by the password enrollment/verification server 200 during an enrollment phase can be based on a joke. In a preferred implementation, a number of jokes can be established that each include one or more variable words or phrases that can be modified to generate a sufficiently random password for each user.

The following exemplary joke provides an example:

Two guys were walking in the woods and came across a big hole. They wondered how deep it was so decided to drop in a pebble and listen for it to hit bottom. They dropped in a pebble and nothing happened. No noise. They dropped in a boulder and there was still no noise. They decided to scout around for something really big to drop in the hole and came across a <railroad tie>. They pushed and pulled it over to the hole and dropped it in. Still no noise.

Suddenly a <goat> ran out of the woods and jumped into the hole. When a farmer came by a little later and asked if anyone had seen his <goat>, they said they had seen a <goat> run out of the woods and jump into the hole.

The farmer said, 'It couldn't have been my<goat>. He was tied to a <railroad tie>!'

In this example, the joke can be presented to the user with one of a number of –10 different variations for each of the words or phrases presented in brackets < >. For example, the word "goat" can be replaced for other users with a word from the following exemplary group: Goat, dog, cat, zebra, aardvark, armadillo; and the phrase can be replaced in further variations for other users with a phrase from the following exemplary group: Railroad tie, log, anvil, refrigerator. It is noted that if there are 32 alternatives for each of the two variable words or phrases, a total of 10 bits of security is provided. Thus, the enrollment process 400 can have a number of available jokes to present to a user. A user interface similar to the interface 600 in FIG. 6 can be used to present the user with a set of jokes in field 610 (during step 410 of the enrollment process 400) from which the user can select a given joke. The set of jokes presented in the window 610 should be populated with choices for the variable words or phrases that were established for the given user. Once the user selects a particular joke as a hint, the user specific combination of variable words or phrases becomes the generated password, such as goat-RRtie.

Figure 10:
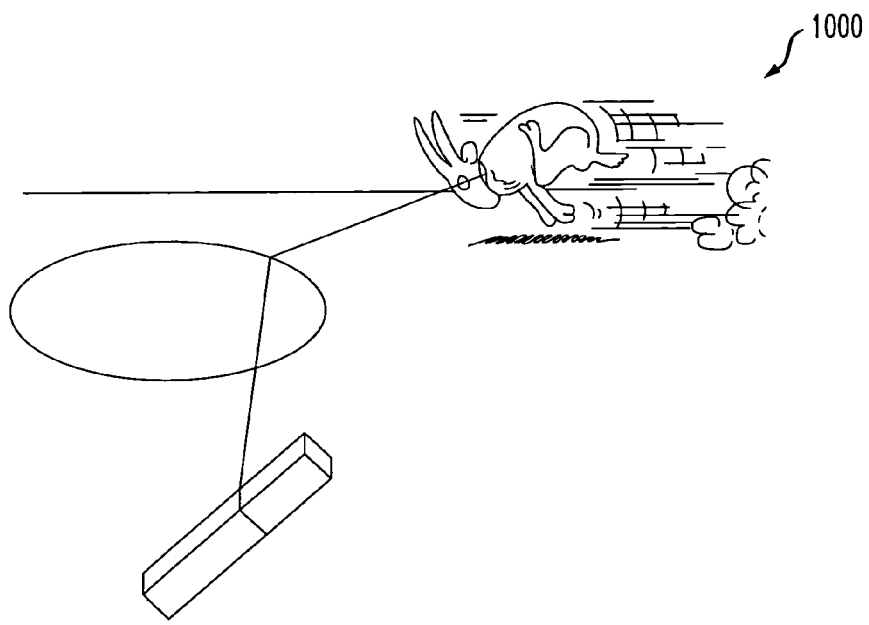
FIGS. 10 and 11 are exemplary visual images that can be presented to a user during or subsequent to enrollment to reinforce a password generated in accordance with the present invention.

Continuing the above example, the generated password and associated hint are recorded in exemplary record 315 of the user database 300 of FIG. 3. Alternative hints could include "Two guys walking through the woods . . . " or "First a pebble, then a boulder, . . . " In addition, the image 1000 shown in FIG. 10 can optionally be periodically sent to the user to reinforce the password. Thus, the user is provided with the visual reinforcement of the image 1000, as well as the joke itself.

The challenge presented to the user by the verification process 500 may be, for example, "That couldn't be mine. My _____ was hitched to a _____."

Pass Words and Pictures

In yet another variation of the present invention, passwords generated by the password enrollment/verification server 200 during an enrollment phase can be based on a set of words selected by the user from a larger set of words. In a preferred implementation, the user is presented with a set of N uncommon words (on the order of several dozen), from which the user must select M words (M<N). In addition, for each word selected by the user, a visual image can be presented to help reinforce the set of pass words.

Figure 11:
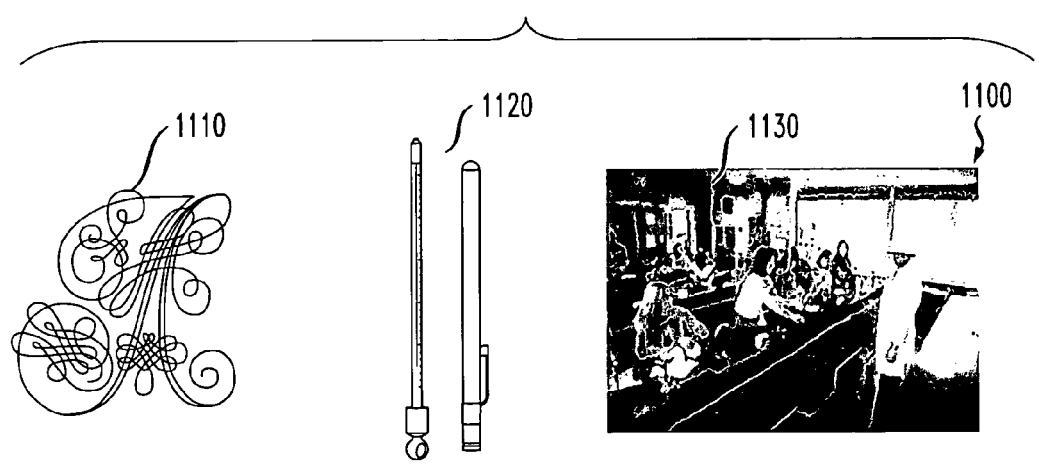

For example, if the user selected the words "extravagant," "thermometer," and "different" from the list of N words, the generated password and associated hint(s) are recorded in exemplary record 320 of the user database 300 of FIG. 3. For example, FIG. 11 illustrates an image 1100 that can be used as a hint to reinforce the words selected by the user. The image 1100 includes three subimages 1110, 1120, 1130 that are each selected to express a corresponding selected word. The subimages may be obtained, for example, by doing an image search of the selected word on Google.com. Alternative hints could include, for example, a sentence constructed from the selected words, such as "The extravagant thermometer was different."

The challenge presented to the user by the verification process 500 may be, for example, "The _____ was _____." The user must fill in the correct words to obtain access to the protected resource.

In a further variation, a user can be provided with a user interface that allows the user to create a visual password using a number of selected "drag and drop" icons. For example, the user can be presented with a set of N "drag and drop" icons (on the order of several dozen), from which the user must select M "drag and drop" icons (M<N) to position in a visual image. The resulting visual image can be presented to the user to help reinforce the set of pass pictures. For example, a user can be presented with a set of N famous people in the form of "drag and drop" icons and be asked to select three people and create an interesting dinner party. For additional security, the user can be asked to position the selected people around a virtual table, or to select background images.

The resulting visual image becomes a password that the user must recreate in order to obtain access to a resource protected by the verification process 500. Alternatively, the user can be queried about content of the image or can create a password using, for example, initials from a vivid scene.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for generating a password for a user, comprising:
   presenting the user with a first hint and a second hint wherein:
   (i) the first hint contains a first variation for a variable word,
   (ii) the second hint contains a second variation for the variable word,
   (iii) the first variation is different from the second variation,
   (iv) the first hint is produced by populating a template with the first variation, and
   (v) the second hint is produced by populating the template with the second variation;
   receiving a user selection of one of the first hint and the second hint; and
   automatically generating a password based on the selected hint;
   wherein the generated password includes the variation for the variable word that is contained in the selected hint.

2. The method of claim 1, wherein the the first hint and the second hint include one or more of poems, songs, jokes, pictures or words.

3. The method of claim 1, wherein the generated password is further based on a user input.

4. The method of claim 1, further comprising the step of presenting the selected hint and the generated password to the user at enrollment.

5. The method of claim 1, further comprising the step of sending the selected hint to the user as a reinforcement of the generated password.

6. The method of claim 1, further comprising the step of recording the selected hint and the generated password in a record associated with the user.

7. The method of claim 1, wherein the selected hint is a poem and the generated password has a similar rhyme and meter as the selected poem.

8. The method of claim 1, wherein the plurality of hints includes a plurality of words and the generated password is based on a subset of the words selected by bv user.

9. The method of claim 8, further comprising the step of generating one or more visual images to represent the subset of the words selected by the user.

10. The method of claim 8, further comprising the step of generating a sentence to reinforce the subset of the words selected by the user.

11. A apparatus for generating a password for a user, comprising:
a memory;
and at least one processor, coupled to the memory, operative to:
present said user with a first poem and a second poem, wherein:
(i) the first poem has a first rhyme and meter,
(ii) the second poem has a second rhyme and meter, and
(iii) the first rhyme and meter is different from the second rhyme and meter;
receive a user selection of one of the first poem and the second poem; and
automatically generate a password based on the selected poem;
wherein the automatically generated password has a rhyme and meter that is similar to the rhyme and meter of the selected poem; and
wherein the automatically generated password is generated by using a letter dictionary that provides rhyme and meter for characters that are found in the automatically generated password.

12. The apparatus of claim 11, wherein the automatically generated password is further based on a user input.

13. The apparatus of claim 11, further comprising the step of presenting the selected hint and the automatically generated password to the user at enrollment.

14. The apparatus of claim 11, further comprising the step of sending the selected hint to the user as a reinforcement of the automatically generated password.

15. The apparatus of claim 11, further comprising the step of recording the selected hint and the automatically generated password in a record associated with the user.

\* \* \* \* \*